United States Patent [19]

Haussuehl et al.

[11] 4,048,514
[45] Sept. 13, 1977

[54] PYROELECTRIC NON-LINEAR OPTICAL COMPONENT

[75] Inventors: Siegfried Haussuehl, Erftstadt-Lechenich; Kurt Recker, Bonn, both of Germany

[73] Assignee: Siemens Aktiengesellschaft, Berlin & Munich, Germany

[21] Appl. No.: 594,627

[22] Filed: July 10, 1975

[30] Foreign Application Priority Data

Aug. 1, 1974 Germany .............................. 2437179

[51] Int. Cl.² .............................................. G02F 1/40
[52] U.S. Cl. .................................. 307/88.3; 329/144; 350/160 R; 363/157
[58] Field of Search ...................... 307/88.3; 321/69 R; 350/160 R; 329/144

[56] References Cited

U.S. PATENT DOCUMENTS 3,833,286  9/1974  Deserno et al. ................. 350/160 R Primary Examiner—Rudolph V. Rolinec
Assistant Examiner—Darwin R. Hostetter
Attorney, Agent, or Firm—Hill, Gross, Simpson, Van Santen, Steadman, Chiara & Simpson

[57] ABSTRACT

A pyroelectric non-linear optical component for detection and frequency control of electromagnetic radiation is comprised of a body consisting of a monocrystalline orthorhombic magnesium barium fluoride ($MgBaF_4$) and means for changing the optical properties of the body. The pyroelectric component may be used in electro-optical systems, such as laser systems, for frequency doubling or mixing of electromagnetic radiation, particularly in the ultraviolet spectral region and may include a pair of electrodes mounted on opposite surfaces of the component for applying a controlled voltage thereto.

5 Claims, 1 Drawing Figure

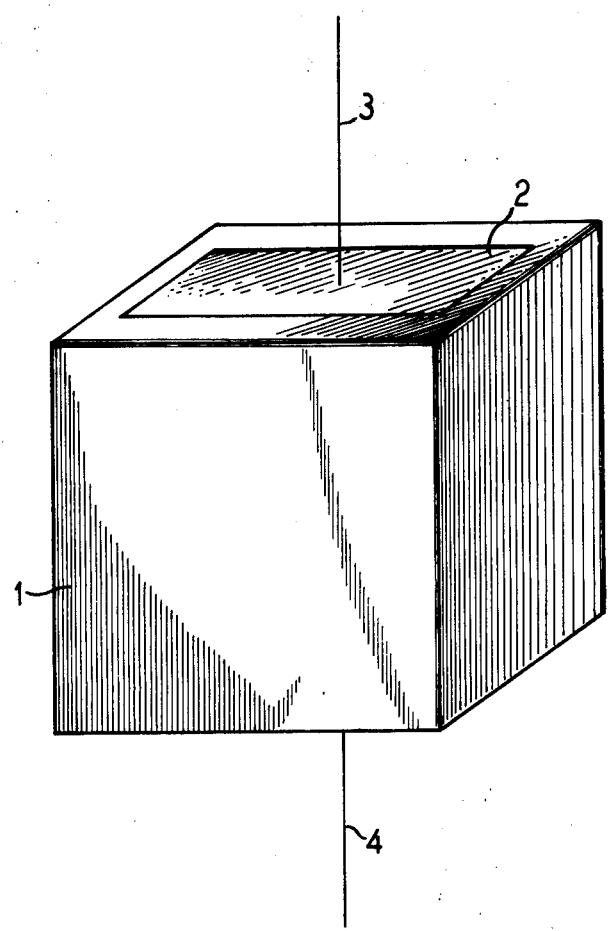

PYROELECTRIC NON-LINEAR OPTICAL COMPONENT

BACKGROUND OF THE INVENTION

1. Field of the Invention

The invention relates to pyroelectric components and somewhat more particularly to pyroelectric non-linear optical components useful for detecting electromagnetic radiation in the infrared, visible and ultraviolet spectral regions.

2. Prior Art

Crystals having non-linear dielectric properties are known for frequency control, such as production of frequency-doubled radiation. Examples of such crystals include ammonium dihydrogen phosphate (ADP), potassium dihydrogen phosphate (KDP) or lithium niobate ($LiNbO_3$) and they are characterized by dielectric constants that are a function of the intensity of an applied electric field. When a light of a given frequency is radiated into such a crystal, i.e., at the so-called fundamental wave frequency, light with frequencies that are harmonics of such frequency is obtained on the outlet side of the irradiated crystal. However, such prior art monocrystals are generally inefficient.

SUMMARY OF THE INVENTION

The invention provides a pyroelectric non-linear structural component for controlling, measuring or detecting electromagnetic radiation, such as in the ultraviolet spectral regions.

The structural component comprises a body composed of monocrystalline orthorhombic magnesium barium fluoride along with a means for changing the optical properties of such body, for example, such as a pair of electrodes mounted on opposite surfaces of the body so that a controlled voltage may be applied thereto. The pyroelectric component of the invention is useful as an extremely efficient component in various operational electro-optical systems, such as laser systems, for measuring temperatures, thermoelectric current production, etc. generally because it exhibits an unusually large pyroelectric effect along the orthorhombic $a$-axis of the magnesium barium fluoride crystal.

BRIEF DESCRIPTION OF THE DRAWING

The FIGURE is a prospective view of the non-linear optical component of the invention.

DESCRIPTION OF THE PREFERRED EMBODIMENTS

The invention provides an extremely efficient pyroelectric non-linear optical structural component for detecting, measuring and/or controlling electromagnetic radiation in the infrared, visible and ultraviolet spectral regions, for example, such as temperatures, thermoelectric current, etc.

The pyroelectric component of the invention consists essentially of a body composed of monocrystalline orthorhombic magnesium barium fluoride ($MgBaF_4$). Such a monocrystalline body is provided with means for changing the optical properties of the monocrystalline, such as a pair of electrodes mounted on opposite surfaces of the body so that a controlled voltage may be applied thereto.

The pyroelectric non-linear optical component of the invention is capable of detecting, measuring, altering and/or controlling electromagnetic radiation with a greater degree of efficiency than available with prior art non-liner optical components.

The monocrystalline pyroelectric component of the invention is extremely efficient, apparently because of the unusually large pyroelectric effect along the orthorhombic $a$-axis of the $MgBaF_4$ crystal.

The pyroelectric component of the invention is useful in various operational electro-optical systems as a non-linear optical device to control radiation, for example, in the ultraviolet spectral region so as to cause frequency doubling, to cause frequency mixing and the like of the electromagnetic radiation within such systems. The pyroelectric component of the invention is particularly useful in detecting radiation or measuring temperatures and for thermoelectric current production.

In addition to the known properties of orthorhombic magnesium barium fluoride, it was discovered that the $MgBaF_4$ crystal also exhibits optical properties necessary for controlling electromagnetic radiation, such as anistropy and dispersion necessary for phase-matching, optical transparency and sufficiently large non-linear tensor coefficients necessary for efficient production of frequency-doubled radiation and/or frequency mixing, particularly in the ultraviolet spectral region.

Suitable electro-optical systems for utilizing the pyroelectric component of the invention are known in the art; for example, see D. Roess, "Lasers, Light Amplifiers and Oscillators" (1969), Academic Press Publishing Co., London and New York; U.S. Pat. Nos. 3,422,370; 3,457,417; 3,508,164; 3,586,997; 3,833,286; or 3,830,558; all of which are incorporated herein by reference as showing useful electro-optical systems that may include the pyroelectric components of the invention. Monocrystals composed of $MgBaF_4$ are readily produced by conventional processes, such as melt growth Bridgman or Czochralski techniques, so that a desired monocrystal is attained. Once a suitable size crystal is attained, it is preferable to cut and polish the crystal surface in a conventional manner to attain a useful optical component.

The drawing illustrates a monocrystalline orthorhombic $MgBaF_4$ body 1 formed in accordance with the principles of the invention. A means for changing the optical properties of the body are illustrated as comprising an electrode 2 on one surface thereof, with a similar electrode (not shown) being provided on the opposite surface of the body 1. Electrical leads 3 and 4 are operationally connected to the electrodes on body 1 for communicating an electrical signal from a voltage source (not shown) so that a select signal can be applied to the body 1 to achieve an electro-optical effect on electromagnetic radiation passing through body 1.

As is apparent from the foregoing specification, the present invention is suceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as is set forth and defined in the hereto-appendant claims.

We claim as our invention:

1. A pyroelectric non-linear optical component comprising a body consisting of morocrystalline orthorhombic magnesium barium fluoride (MgBaF$_4$) and means for changing the optical properties of said body.

2. A pyroelectric non-linear optical component as defined in claim 1 wherein said means includes a pair of electrodes, each mounted on an opposing surface of said body.

3. In an operational electro-optical system including a means for producing electromagnetic radiation in the infrared, visible and ultraviolet spectral regions and a means for frequency control of said electromagnetic radiation, the improvement comprising that said means for frequency control comprises a pyroelectric non-linear optical component comprised of a body consisting of monocrystalline orthorhombic magnesium barium fluoride (MgBaF$_4$).

4. A method of obtaining a harmonic frequency of a basic frequency of electromagnetic radiation in the infrared, visible and ultraviolet spectral regions comprising:

projecting electromagnetic radiation of a basic frequency through a pyroelectric non-linear optical component comprised of a body consisting of monocrystalline orthorhombic magnesium barium fluoride which emits a harmonic frequency of said basic frequency.

5. A method of detection and controlling a beam of electromagnetic radiation in the infrared, visible and ultraviolet spectral regions, comprising:

projecting a beam of electromagnetic radiation through a pyroelectric non-linear optical component having a body composed of monocrystalline orthorhombic magnesium barium fluoride; and changing the optical properties of said body by applying a voltage to electrodes disposed on said body so that the characteristics of said beam are changed in response to the changes in the optical properties of said body.

* * * * *